INVENTOR.
Francis O. Blackwell, III
BY
Christel + Bean
ATTORNEYS.

INVENTOR.
Francis O. Blackwell, III
BY
Christel + Bean
ATTORNEYS.

INVENTOR.
Francis O. Blackwell, III
BY
Christel + Bean
ATTORNEYS.

INVENTOR.
Francis O. Blackwell, III
BY
Christel + Bean
ATTORNEYS.

July 30, 1968 F. O. BLACKWELL III 3,395,282

PHOTOELECTRIC TRACING SYSTEM WITH AN OPTICAL SCANNING HEAD HAVING A DRIVE MOTOR AND SIGNAL GENERATOR THEREON

Filed April 19, 1965 5 Sheets-Sheet 5

INVENTOR.

Francis O. Blackwell, III

BY

Christel + Bean

ATTORNEYS.

United States Patent Office 3,395,282
Patented July 30, 1968

3,395,282

PHOTOELECTRIC TRACING SYSTEM WITH AN OPTICAL SCANNING HEAD HAVING A DRIVE MOTOR AND SIGNAL GENERATOR THEREON

Francis O. Blackwell III, Seneca Falls, N.Y., assignor to Seneca Falls Machine Company, Seneca Falls, N.Y.

Filed Apr. 19, 1965, Ser. No. 449,234
12 Claims. (Cl. 250—202)

This invention relates generally to the control art, and more specifically to a new and useful photoelectric tracer control system for machines.

While the system of my invention is disclosed herein as applied to a vertical mill, it will be appreciated that the tracing system of my invention is equally applicable to other machine tools, and to machines generally including, without limitation, routing, sewing, flame cutting and welding machinery.

A primary object of my invention is to provide a photoelectric tracing system for the control of machines, which will trace a simple line, as well as an edge, with a high degree of accuracy.

Another object of my invention is to provide the foregoing in a system capable of a rapid response to variations in the line or edge being traced and capable of high speeds of operation.

It is also an object of my invention to provide a photoelectric tracing system which is relatively free from error and malfunction because of variations in motor speed or line frequency.

In one aspect thereof, a photoelectric tracing machine control system of my invention is characterized by the provision of an optical sensing head having a casing, an optical tube journaled in the casing for rotation relative thereto about an axis, a viewing aperture at one end of the tube in eccentric relation to the rotational axis for scanning a circular path upon rotation of the tube, a drive motor mounted in the casing and having a rotor mounted on the tube for rotating the same, and a generator mounted in the casing and having a rotor mounted on the tube for being rotated thereby.

In another aspect thereof, a photoelectric tracing control system of my invention is characterized by the provision of rotary optical scanning means, a photocell for generating successive leading and trailing pulses in response to scanning of a line, timing means triggered by the leading pulses and operable to reject the trailing pulses, signal generating means synchronized with the scanning means, and gating means controlled by the timing means and arranged in controlling relation to the signal generating means for producing a drive signal proportional to feed rate.

The foregoing and other objects, advantages and characterizing features of the photoelectric tracing system of my invention will become clearly apparent from the ensuing detailed description of an illustrative embodiment thereof, taken together with the accompanying drawings depicting the same wherein like reference numerals denote like parts throughout and wherein.

Figure 1:
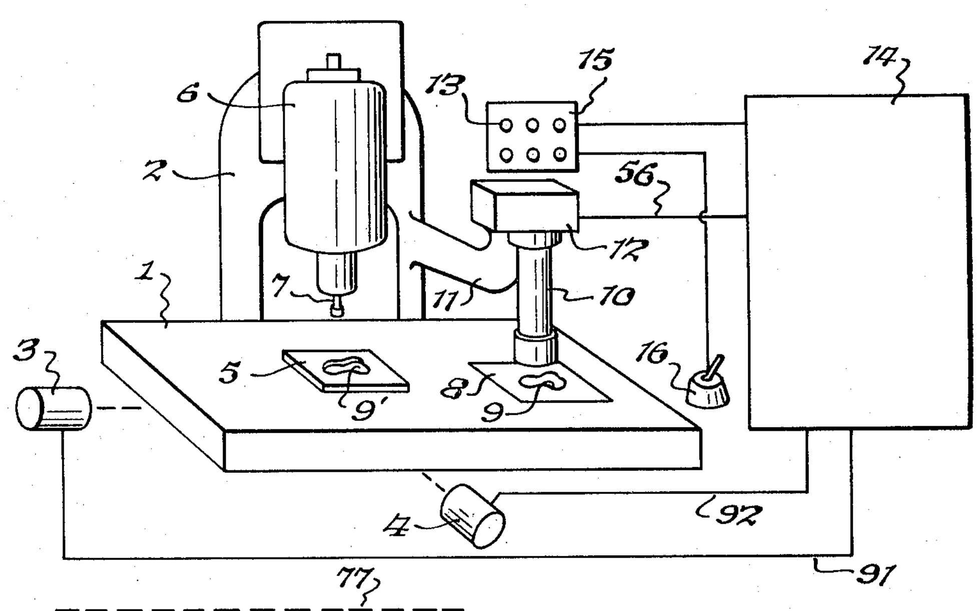
FIG. 1 is a schematic view of a photoelectric tracing system of my invention applied to a vertical mill.

Referring now in detail to the illustrative embodiment depicted in the accompanying drawings there is shown in FIG. 1 a work table 1 mounted on a supporting frame 2 for movement in a horizontal plane along quadrature axes, the table being driven by X and Y axis servo drive motors 3 and 4, respectively. Servo drives 3 and 4 move work table 1 in a manner known in the art, and can be either A.C. or D.C. motors of any suitable type. Preferably, they are of the mechanical amplifier type, such as shown in pending U.S. patent application Ser. No. 285,683, filed June 5, 1963 now Patent 3,187,599, dated June 8, 1965.

A workpiece 5 is mounted on table 1 in a position to be worked upon by for example a vertical milling fixture 6 having a cutting tool 7 arranged to cut a pattern into the workpiece. In this instance the pattern to be cut in the workpiece is depicted in a line drawing 8, the pattern comprising a line 9 on drawing 8. This pattern, which could be depicted in an edge drawing as well as a line drawing, is duplicated in workpiece 5 as indicated at 9'.

In the instant case work table 1 and workpiece 5 move relative to cutting tool 7, although it will be appreciated that the reverse could as well be true. Line drawing 8 moves with table 1 relative to an optical tracing head of my invention, generally designated 10. Head 10 comprises part of the tracing system, and can be mounted on machine frame 2 as by a connecting arm 11. Head 10 actuates a photocell assembly, generally designated 12, in accordance with the pattern 9 being traced. The output of the photocell assembly is transmitted via lead 56 to control circuitry generally denoted 14, the output of which controls servo drives 3 and 4. An operator's control station 15 is provided, together with a joy stick arrangement 16 for manual control of the table movement.

*Optical tracing head*

Figures 2, 7:
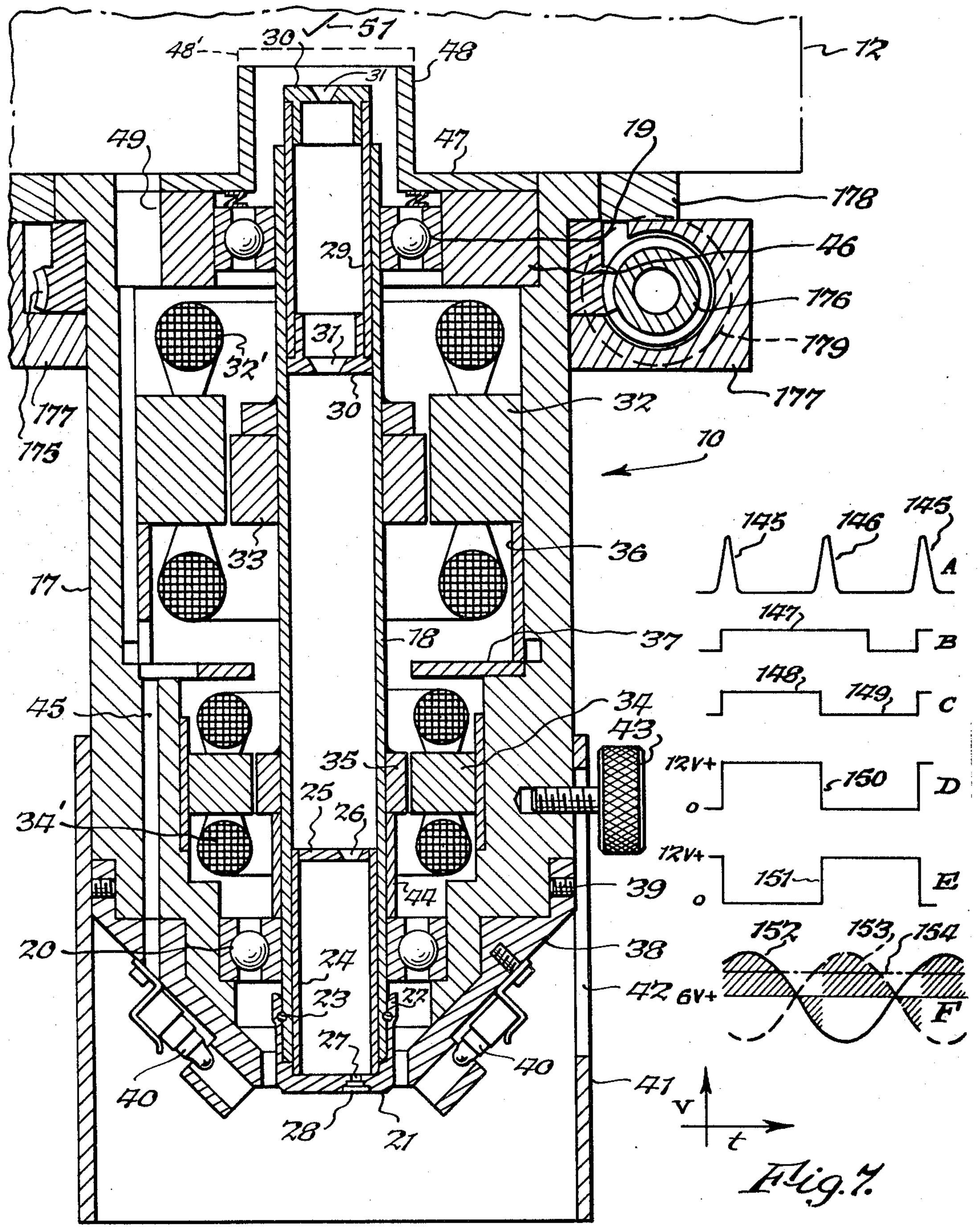
FIG. 2 is a longitudinal sectional view through an optical head of my invention.
FIG. 7 is a vertically alined graphical representation of signals in terms of voltage against time at various points in the system.

Referring now to FIG. 2, optical tracing head 10 comprises a tubular casing 17 of generally cylindrical form. A rotating optical tube 18 is journaled in casing 17 by spaced bearing assemblies 19, 20 for rotation about the axis of the casing 17. This axis is perpendicular to work table 1 and line drawing 8. At its lower end, tube 18 mounts a scanning head comprising an end cap 21 having a skirt 22 slip fitting over the end of tube 18, the cap being releasably held in place by snap fit engagement with a ring 23 carried by tube 18 and engaging in a groove in skirt 22. The scanning head includes a tubular body 24 slip fitting into tube 18 and terminating in an inner end wall 25. End wall 25 contains an aperture 20 in alinement with an aperture 27 in the end wall of cap 21, the latter aperture containing a lens opening in which is mounted a lens 28. Apertures 26 and 27 and lens 28 are offset from the axis of rotation of tube 18, being eccentric relative thereto and thereby generating a viewing circle about the tube axis.

At its opposite end, tube 18 contains a baffle assembly including a tubular body 29 fitting within the upper end of tube 18, the body 29 being closed at its opposite ends by plugs 30 each containing an aperture 31 alined with the axis of rotation of tube 18.

A drive motor is mounted in head 10, having a stator 32 containing windings 32' fitted against the wall of casing 17 and a rotor 33 secured to tube 18 for rotating the same. A generator also is mounted in casing 17, having its stator 34 containing windings 34' secured against an inwardly stepped portion of the casing wall and a rotor 35, preferably permanently magnetized, mounted on tube 18 for rotation thereby. Thus, drive motor 32, 33 rotates tube 18, and simultaneously drives generator 34, 35 in unison therewith.

An illuminating assembly is mounted on the lower end of head 10, comprising a shouldered annular body 38 secured to the correspondingly shouldered lower end of casing 17 as by set screws 39 and carrying light sources directed centrally downwardly to illuminate line drawing 8. While a plurality of circularly arranged individual light sources 40 are shown in the drawing, other lighting arrangements can be used, it being understood that the illumination sources are focused on that portion of line drawing 8 being scanned by the rotating tube 18.

Also, in lieu of light sources carried by head 10, to provide a reflected illumination of line drawing 8, the line drawing could be illuminated from below by means not shown providing a through illumination thereof.

A light shield 41 of tubular cylindrical form is mounted on the lower end of head 10, having a slot 42 receiving a clamping nut 43 for locking the shield 41 in vertically adjusted position. Shield 41 functions to avoid interference from extraneous illumination, and also functions as a reflector to intensify the illumination of the drawing.

Drive motor stator 32 comprises a subassembly having a snug fit within casing 17 and including a side wall shell 36 and an end wall 37. A spacing sleeve 44 extends between generator rotor 35 and the lower bearing assembly 20, thereby maintaining the desired endwise position of tube 18 in head 10.

Passageways are formed through the casing 17, body 38 and members 36 and 37, as indicated at 45, for the passage of energizing leads to light sources 40.

At its upper end, casing 17 is closed by an end wall assembly including a ring 46 seated within the shouldered outer end of casing 17 and an end wall plug member 47 providing an axially projecting probe end 48 for insertion in a socket 48' in photocell assembly 12, in a manner known in the art, thereby providing a precise alinement of optical tube 18 and its end apertures 31 with the inlet to photocell 12.

The upper end of tube 18 is closed by the assembly 30, which is apertured at 31, for the purpose of eliminating "noise" from scattered light. Apertures 31 are of a diameter such as to receive and pass only direct illumination through apertures 26 and 27, the term illumination being used in a relative sense, while blocking the passage of such illumination as may be reflected from the inner wall surface of tube 18, which reflected light otherwise would cause interference. Other baffling arrangements can be used, or the inner wall of tube 18 might be treated to eliminate reflection.

For initial alinement, and for biasing adjustments as will be described hereafter, casing 17 and generator stator 34 can be positionally rotated relative to arm 11 and pattern 8 with the optical head 10 assembled in place with respect to photocell 12. This rotational adjustment is accomplished by a worm wheel 175 on casing 17 engaged by a worm gear 176 journaled in a mounting ring 177 carried by arm 11. A bearing ring 178 supports photocell assembly 12 for rotary positioning with head 10. Thus turning hand wheel 179 drives gear 176 to rotate casing 17 and generator stator 34, adjusting the position of generator stator 34 relative to its permanent magnet rotor 35 which latter is fixed in relation to the eccentric scanning aperture 27, for biasing as hereafter described. Motor 32, 33 is an induction motor, permitting such relative positioning.

*General circuit description*

Figure 3:
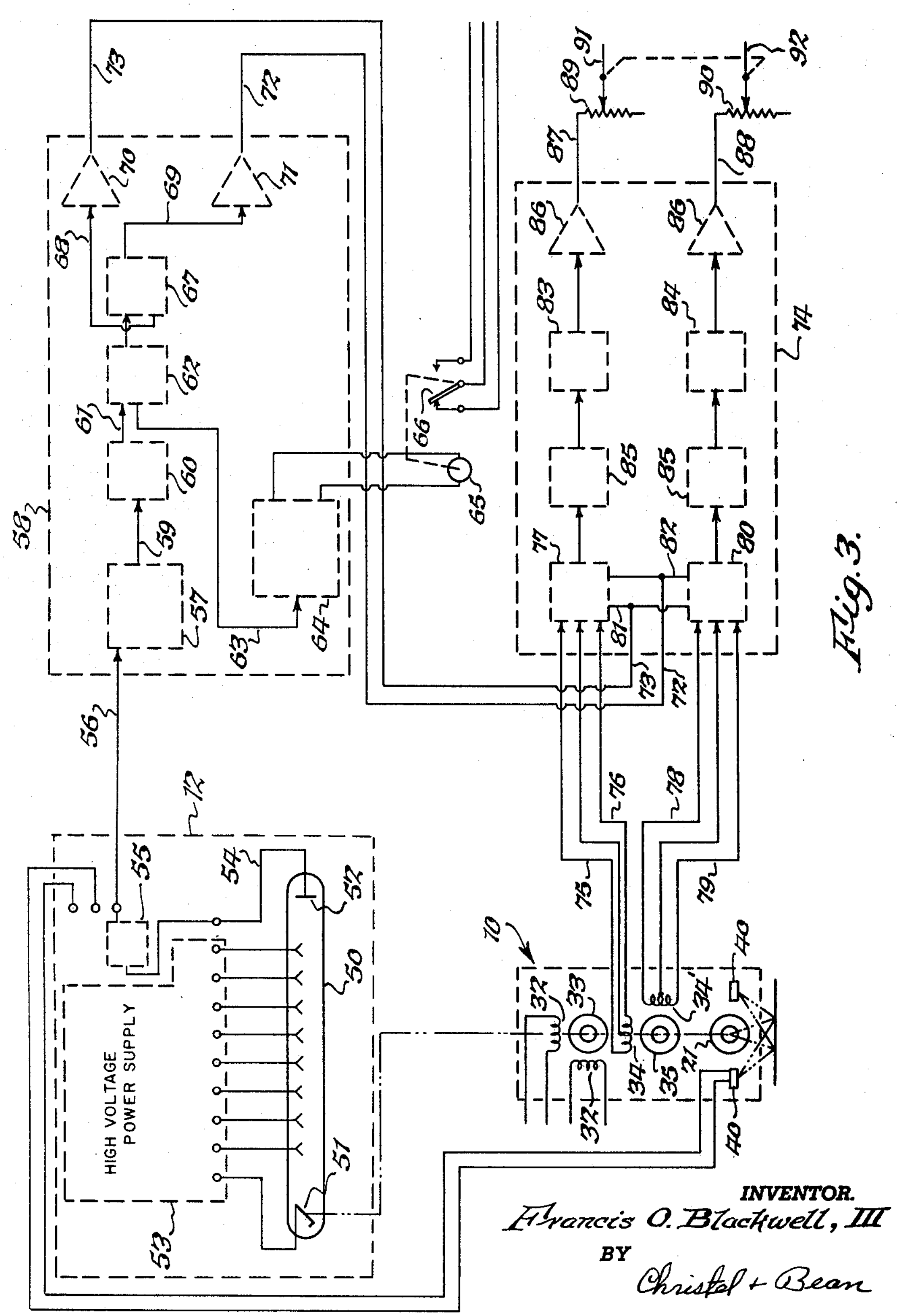
FIG. 3 is a generally diagrammatic layout of a photoelectric tracing control system of my invention.

Referring now to FIG. 3, photocell assembly 12 includes any conventional light sensitive electronic device herein identified as a photocell, a photo multiplier tube 50 being shown by way of illustration. Tube 50 is so arranged relative to optical head 10 that light pulses passing through apertures 31 strike the cathode 51 of the tube, generating an output pulse from the anode 52. A high voltage power supply 53 is provided for the tube 50.

The output from anode 52 passes via lead 54 to an emitter follower generally designated 55 which isolates the photo tube from the remainder of the control circuit and provides the desired loading of the tube, as will be described.

The output from emitter follower 55 is transmitted via lead 56 to a tracing switch control 57 comprising part of a control assembly generally designated 58. From the tracing switch control 57 the signal is transmitted via lead 59 to a Schmitt trigger 60 where it is shaped to provide a pulse having a sharp rise, for purposes to be described.

The output from Schmitt trigger 60 passes via lead 61 to the first flip flop stage 62 of a multi vibrator circuit, the function of flip flop 62 being to reject trailing edge pulses, as will be described hereafter. The first flip flop 62 also provides an actuating signal via lead 63 to an on-line circuit 64 which controls a relay 65. A switch 66 is operated by relay 65 and can be connected to perform a number of functions such as: turning on a light 13 (FIG. 1) to visually indicate when tracing head 10 is on the line being traced; shutting down the drive system when the tracing head is no longer on the line to be traced; and other functions. A second flip flop stage 67 provides a second pulse spaced approximately 180° from the leading edge pulse which triggered the first flip flop stage 62.

The output pulses from the second flip flop stage 67 are transmitted in step form via leads 68 and 69 to amplifiers 70, 71 of conventional design. The amplified signals are transmitted via leads 72, 73 to a gating and modulator control assembly 74 where they are used to gate the output signals from the quadrature spaced windings 34, 34' of the tracing head generator, for control of the servo drives 3, 4.

The output signal from one quadrature winding 34 is transmitted via leads 75, 76 to a diode switch 77 for that axis. The output from the other quadrature winding 34' is transmitted via leads 78 and 79 to a diode switch 80 for the other axis. Diode switches 77, 80 are gated by the multivibrator output through leads 72, 73, 81 and 82. The output signals from the respective diode switches are transmitted to modulators 83, 84 via low pass filters 85, providing D.C. signals proportional to the desired speeds and of a polarity corresponding to the desired direction of movement along the respective axes. The modulated signals are amplified at 86 and transmitted via leads 87 and 88, and ganged potentiometers 89, 90 for feed rate control, to leads 91 and 92 to the respective X and Y axes servo motor drives 3, 4.

Where the servo motors are D.C. motors the modulators can be omitted and the D.C. signals from diode switches 77 and 78 passed directly through filters 85 and amplifiers 86 to the respective drives.

*Circuit details*

Figure 4:
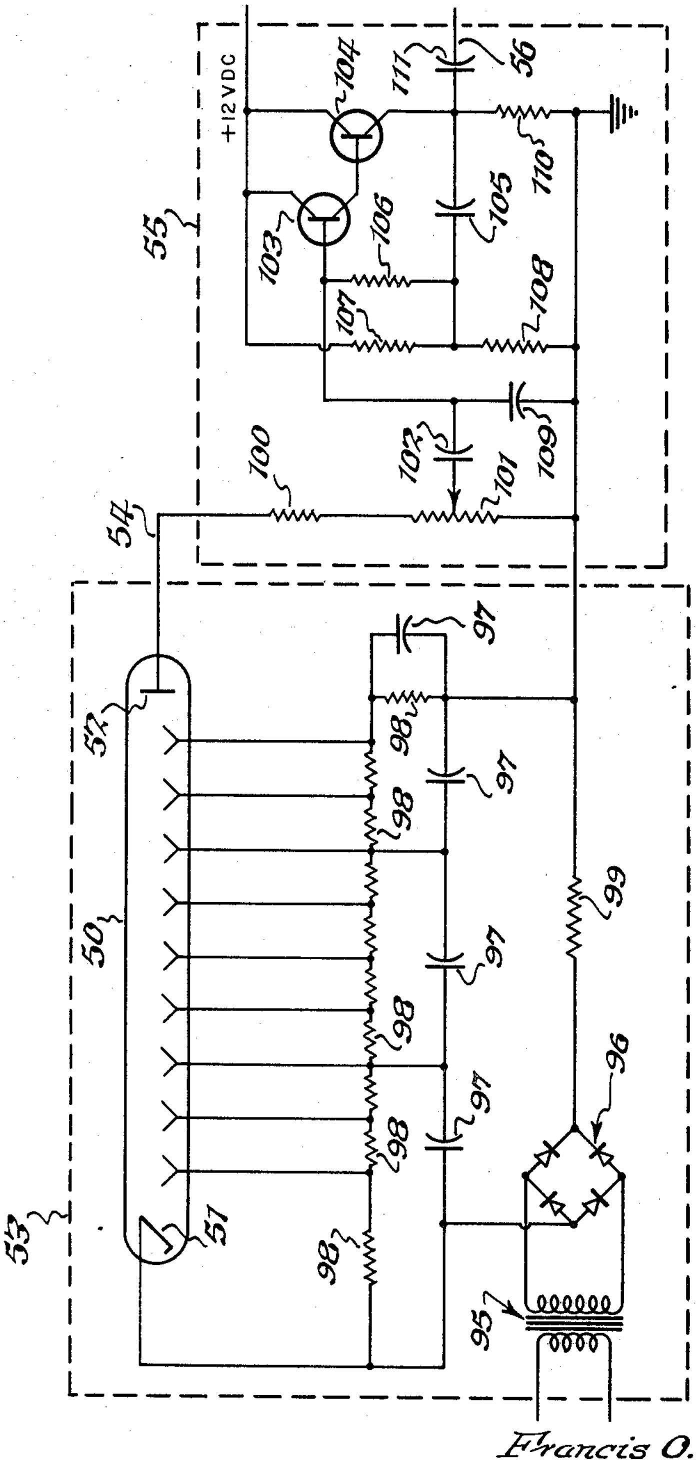
FIG. 4 is a view illustrating the photocell circuit.

Referring now in specific detail to the particular embodiment chosen by way of illustration, the power supply 53 of the photocell 50 is shown in FIG. 4 as being energized from any available A.C. source, not shown, and includes a step up transformer 95 and a rectifier 96. The rectified power is transmitted to cathode 51 and to the diodes via a conventional bleeding and filtering network including condensors 97 and resistances 98, the arrangement and operation of which is well known to those skilled in the art. Power supply 53 also includes a regulating resistance 99 connected in series, to provide the energizing voltage desired for the tube 50. The output signal from photocell 50 passes to emitter follower 55 via a coupling resistance 100 and a variable potentiometer 101 from which the desired amplitude of signal is tapped. Potentiometer 101 thereby provides a means for adjusting the system to accommodate different operating conditions with respect to the contrast provided on the line drawing in a particular situation.

Emitter follower 55 performs an isolating function, in effect insualting the photocell assembly from the balance of the system while serving to transmit the photocell output to the necessary control components.

The signal tapped from potentiometer 101 is transmitted via coupling capacitor 102 to the base of a Darlington pair of transistors 103, 104 energized from a suitable lower voltage D.C. source, not shown. The Darlington transistor pair presents a very high input impedance but a very low output impedance, giving a substantial power amplification of the input signal without however, producing any variation in pulse height.

Emitter follower 55 includes a boot strap feedback circuit comprising capacitance 105 and resistance 106 assisting the Darlington pair in providing the desired high input impedance coupled with power amplification as described above. A biasing network comprising resistances 107 and 108 determines the operating level of transistors 103, 104, and a filtering condenser 109 and grounding resistance 110 are provided to complete the circuit.

Figure 5:
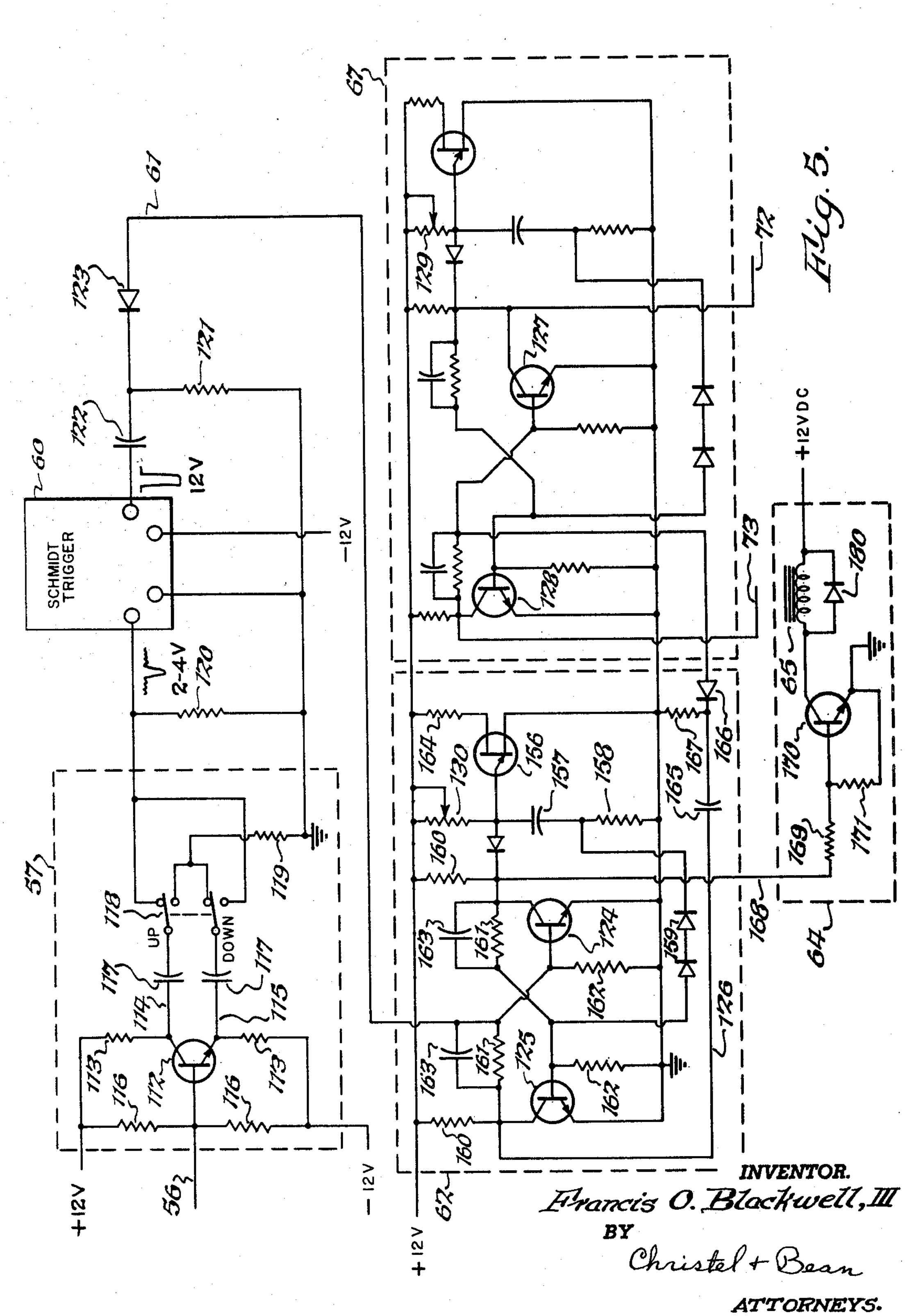
FIG. 5 is a view showing the tracing control, pulse shaping, gating control and on-line circuits.

The output from emitter follower 55 is transmitted via lead 56 and coupling condenser 111 to a complementary output transistor arrangement comprising part of the tracing switch circuit 57 (FIG. 5). This arrangement includes a transistor 112 having its base connected to output lead 56 from emitter follower 55. Both the collector and the emitter of transistor 112 are provided with loading resistances 113 and comprise complementary output circuits including the leads 114, 115. The output signals transmitted vial leads 114, 115 are complementary and equal, but opposite in polarity. Biasing resistances 116 determine the operating level of transistor 112. One or the other of the output pulses is transmitted via coupling condensers 117 and switch 118 to the input of Schmitt trigger 60.

The complementary pulses of opposite polarity and switch 118 are provided for the purpose of providing the Schmitt trigger 60 with a negative pulse input, this being the only pulse which the Schmitt trigger will accept, regardless of whether the optical sensing head is tracing a light line on a dark background or a dark line on a light background. A grounding resistance 119 is provided to ensure balanced loading of the transistor 112.

Schmitt trigger 60 is of conventional form, its function being to shape the ragged and relatively weak input pulse and produce an output pulse having a sharply defined steep rise, as clearly indicated on the drawing. Since Schmitt trigger circuits are well known, the details thereof have been omitted. A loading resistance 120 is provided, as is a grounding resistance 121.

The output from the Schmitt trigger 60 passes via coupling condenser 122, blocking diode 123 and lead 61 to the first flip flop stage 62, turning off transistor 124 and turning on transistor 125. Turning on transistor 125 produces a negative voltage swing via lead 126 which turns off transistor 127 and turns on transistor 128 in the second flip flop stage 67. Turning on or setting the second flip flop stage 67 as thus described initiates the reset function, the timing of which can be adjusted by a variable potentiometer 129. In like manner, the above described setting of the first flip flop stage 62 initiates its reset function the timing of which can be adjusted by variable potentiometer 130. Prior to resetting of first flip flop stage 62 it will be insensitive to succeeding pulses transmitted to it via lead 61, and potentiometer 130 is adjusted to cause the first flip flop stage 62 to reset subsequent to the trailing edge pulse and prior to the succeeding leading edge pulse, the terms "leading" and "trialing" having reference to the direction of relative movement of head 10 along line 9 (FIG. 1). For example, potentiometer 130 can be set to cause resetting of stage 62 approximately 300° after intersecting the leading edge of line 9. Potentiometer 129 is adjusted to cause resetting of stage 67 in the area of 180° after intersecting the leading edge of line 9. Theoretically it would reset at 180° from the point of intersection with the leading edge of the line. However, where it is desired to actually trace the line, as distinguished from the leading edge of the line, some adjustment from 180° normally is required.

Figure 6:
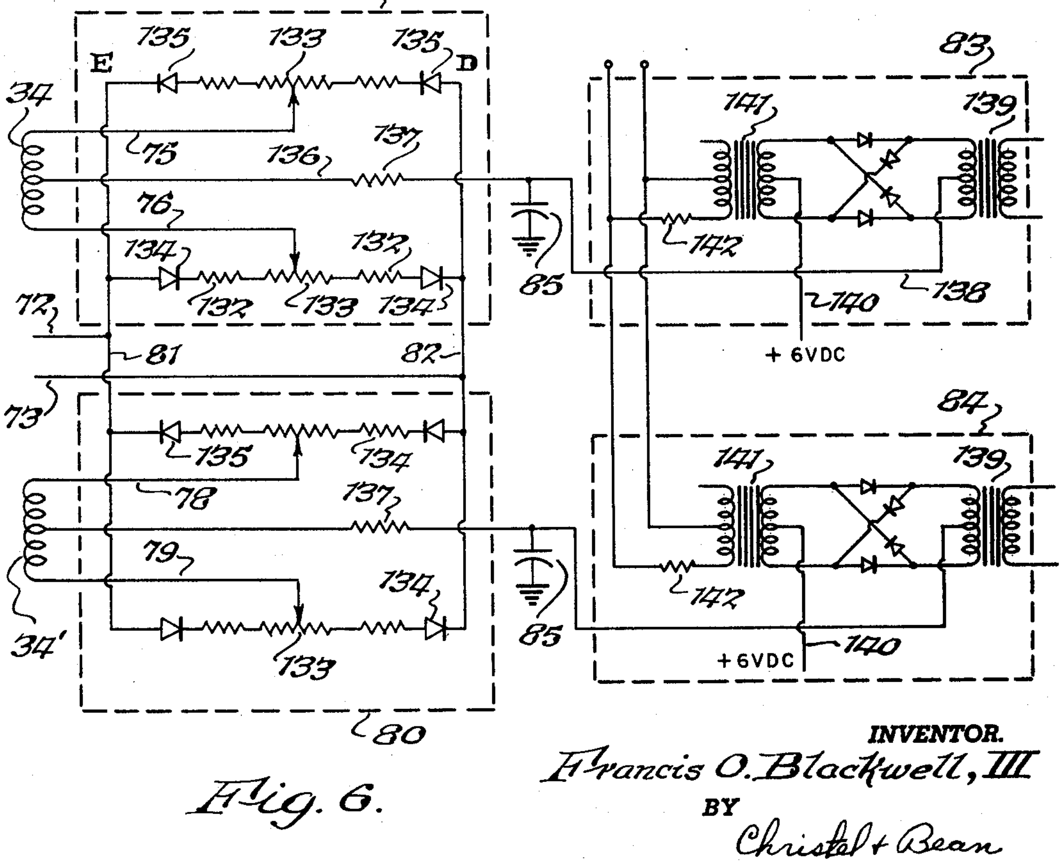
FIG. 6 is a view of the gating and modulator circuits.

As previously described, the output signals from flip flop stage 67 are transmitted via amplifiers 70, 71 and leads 72, 73 to the diode gate circuits. Diode gates 77 and 80 are identical, as are modulators 83 and 84. Therefore, only one of each will be discussed in detail. Referring now to FIG. 6, diode gate 77 includes a pair of A.C. grounding networks arranged in opposition and each including in the illustrated embodiment a pair of resistances 132 and an adjustable potentiometer 133 in series with blocking diodes 134 and 135. Diodes 135 are arranged in opposition to diodes 134 whereby for a given voltage drop between leads 81 and 82 only one of the grounding networks will be conducting. Generator stator winding 34 has its opposite ends connected to the two grounding networks, whereby only one side of the winding 34 is grounded at any one time.

In like manner, generator stator winding 34' is grounded through gate 80.

The voltage drop between lines 81 and 82 is reversed in polarity by the resetting of the second stage flip flop 67, whereby it is of one polarity when flip flop 67 is first set by the triggering pulse and of the opposite polarity when flip flop 67 resets itself approximately 180° later.

Grounding of generator field 34 through one of the grounding networks permits the output signal from that winding to pass via lead 136, resistance 137 and filtering condenser 85, while the subsequent grounding of field coil 34 through the other grounding network causes the inverse of the generated signal to be transmitted via lead 136. These signals average out in the filtering network 85, producing a resulting D.C. average voltage signal which is transmitted via lead 138 to the center tap of the primary winding of a transformer 139. A base voltage signal of the same magnitude as the voltage tapped from potentiometers 133, in this instance 6 volts, is transmitted from a suitable source via lead 140 to the center tap of the secondary winding of a transformer 141. The voltage difference between these signals (i.e. leads 138 and 140) is proportional to the rate of feed along the X axis (in the case of gate 77; the Y axis in the case of gate 80) required to follow line 9, and the polarity thereof indicates the necessary direction of travel.

The foregoing operation is illustrated graphically in FIG. 7 where part A represents successive output pulses from photocell 50, showing alternating leading and trailing edge pulses 145, 146. Part B denotes the pulse in the first flip flop stage 62, which pulse 147 is triggered by the leading edge pulse 145 and continues in time beyond the trailing edge pulse 146, thereby rejecting the latter from the gating circuit.

Part C of FIG. 7 denotes the pulses 148 and 149 of the second flip flop stage 67, pulse 148 being initiated by the pulse 147 of the first flip flop stage 62, and pulse 149 occurring approximately 180° later as determined by reset potentiometer 129. Part D indicates the voltage level pattern at D in FIG. 6, while part E denotes the voltage level pattern at E in FIG. 6, the former being represented as a pulse 150 and the latter as a pulse 151. The output from generator winding 34 is shown at 152 in part F, and its inverse is shown at 153.

Thus, it is seen that the voltage level pulse 150 gates the generator output signal 152, and pulse 151 gates the inverse signal 153. Depending upon the point in time of gating, an average D.C. output 154 is obtained and this, when compared to the base or reference as determined by potentiometer 133, is proportional to the rate of feed along that axis. FIG. 7 illustrates the mode of operation for a rate of feed along the X axis equal to the rate of feed along the Y axis, producing movement at 45°.

Transformer 141 is energized from a suitable A.C. source, not shown, via a current limiting resistor 142, the output of transformer 139 thereby providing a modulated A.C. drive signal corresponding to the indicated rate of feed and direction of movement along the particular axis. This signal is amplified at 86 (FIG. 3) and transmitted to the servo drive for that axis as previously described. Where D.C. servo drives are utilized, modulators 83 and 84 can be omitted.

The flip-flop stages 62 and 67 are identical, except for the relative adjustment of the reset function. Each can comprise a conventional one-shot multivibrator including a unijunction transistor 156. When the transistor 124 is turned off, condenser 157 charges through potentiometer 130. When transistor 156 fires, it generates a pulse across resistor 158, this pulse being coupled through diodes 159 to the base of transistor 125, turning it off and resetting the circuit to its initial condition. Load resistances 160, bias resistances 161 and grounding resistances 162, together with filtering condensers 163 are provided, along with a temperature compensating resistance 164, the function and operation thereof being well known to those skilled in the art, further comment is not required.

The flip flop stages are connected via lead 126, coupling condenser 165 and a blocking diode 166, a grounding resistance 167 also being provided. The first flip flop stage 62 is connected to the on-line circuit 64 via lead 168, coupling resistance 169 and a transistor 170, the level of operation of which is determined by a bias resistance 171. Relay 65 is controlled by operation of transistor 170. The characteristics of relay 65, and its control circuit including blocking diode 180 cause relay 65 to remain energized during the time the first flip flop stage 62 is off. Stage 62 is off when it has been reset, which is adjusted to occur after the lagging pulse, whereby the latter is rejected.

It will be appreciated that control panel 15 will contain such start and stop, manual and automatic and other controls as may be desired, and that joy stick 16 will be connected into the circuit for manual actuation of the work table 1, all in a manner well understood by those skilled in the art. Therefore, and inasmuch as the details of such arangements are not per se a part of my invention, they are not included here.

Accordingly, it is seen that my invention fully accomplishes its intended objects. There is provided a photoelectric tracing system for the control of machines, which will accurately reproduce both a line and an edge type of pattern. The optical sensing system does not require a synchronous motor to drive the rotating head, and line frequency is not used as a reference. Instead, the generator is directly coupled to the rotary scanning element, for being driven thereby, whereby the generator output signal frequency is directly related to the speed of rotation. As a result, a high degree of accuracy can be maintained. Also, instead of relying upon the relatively low line frequency usually available, the optical tube can be driven at higher speeds, giving a much higher information rate, permitting accurate tracing at very high rates of speed.

Bias adjustments can be made, by adjusting the position of the generator output windings relative to the pattern. Also, the scanning head can be readily detached and replaced by a scanning head having a viewing aperture offset a different distance from the axis of rotation, to generate a larger or smaller viewing circle.

Indeed, one edge of the line is traced because the system uses as the triggering pulse the point of intersection of the scanning head with one edge of the line, the succeeding pulse being rejected. Where it is desired to follow for example the center of the line 9, instead of its leading edge, this can be done by adjustment of the reset timing in stage 67. Infinite control of feed rate is available, and difficult shapes can be accurately traced, including sharp corners presenting a direction change in excess of 90°. Square corners can be traced at high speed, and curves are smoothly traced. At the end of a line, the system will rapidly reverse direction and retrace the line, automatically, along the opposite edge.

While I have disclosed and described in detail only one embodiment of my invention, that has been done by way of illustration, without thought of limitation.

Having fully disclosed and completely described my invention, and its mode of operation, what I claim as new is:

1. In a machine control system of the photoelectric tracing type, an optical sensing head comprising a casing, an optical tube rotatable within said casing, said tube having a viewing aperture adjacent one end thereof in eccentric relation to the axis of rotation of said tube, a drive motor having a rotor mounted on said tube for rotating the same, and a generator having a rotor mounted on said tube for being rotated thereby, whereby the output of said generator is determined by the speed of rotation of said optical tube.

2. A machine control optical sensing head as set forth in claim 1, in a control system for a machine having an axis of movement, wherein said generator has a stator comprising an output winding mounted in said casing, together with means for selectively adjusting the position of said winding relative to said axis of movement.

3. A control system as set forth in claim 2, for a machine having coordinate axes of movement, said generator having quadrature windings positionally adjustable relative to said axes.

4. A photoelectric tracing control system comprising rotary optical scanning means, means including a photocell generating pulses in response to scanning, pulse responsive timing means, signal generating means synchronized with said scanning means, and means including gating means controlled by said timing means and arranged in controlling relation to said signal generating means for producing a drive signal proportional to feed rate.

5. In a machine control system of the photoelectric tracer type, an optical sensing head comprising a tubular casing, an optical tube journaled in said casing for rotation relative thereto about the lengthwise axis of said tube, a scanning head at one end of said tube, said head having a viewing aperture in eccentric relation to said axis for scanning a circular path about said axis upon rotation of said tube, a drive motor having a stator mounted in said casing and a rotor mounted on said tube for rotating said tube about said axis, and a generator having a stator mounted in said casing and a rotor mounted on said tube for being rotated by said tube, said generator thereby generating an output signal having a frequency determined by the speed of rotation of said tube.

6. A photoelectric tracing machine control system comprising rotary optical scanning means, a photocell for generating successive leading and trailing pulses in response to scanning of a line, timing means triggered by said leading pulses and operable to reject said trailing pulses, signal generating means synchronized with said scanning means, and gating means controlled by said timing means and arranged in controlling relation to said signal generating means for producing a drive signal proportional to feed rate.

7. A control system as set forth in claim 6, wherein said timing and gating means include means for combining the generated signal and the inverse thereof.

8. A photoelectric tracing control system comprising rotary optical scanning means, a photocell for generating successive leading and trailing pulses in response to scanning of a line, first multivibrator means triggered by said leading pulses and including reset means timed to reject said trailing pulses, second multivibrator means triggered by said first multivibrator means, signal generating means synchronized with said scanning means, and gating means arranged in controlling relation to said signal generating means, said gating means being controlled by said second multivibrator means to combine the generated signal and the inverse thereof to produce a resulting signal proportional to feed rate.

9. A control system as set forth in claim 7, said second multivibrator means resetting prior to resetting of said first multivibrator means, together with means for selectively independently adjusting the reset timing of said first and second multivibrator means.

10. A photoelectric tracing control system comprising means for supporting a pattern to be traced, rotary optical scanning means, means including a photocell for generating successive leading and trailing pulses in response to scanning, first multivibrator means triggered by said leading pulses and including reset means timed to reject said trailing pulses, second multivibrator means triggered by said first multivibrator means, a signal generator driven by said scanning means, and means including gating means controlled by said second multivibrator means and arranged in controlling relation to said generator for producing a drive signal proportional to feed rate.

11. A control system as set forth in claim 10, operable without adjustment to scan an edge as well as a line.

12. A photoelectric tracing control system comprising rotary optical scanning means, means including a photocell generating pulses in response to scanning, pulse responsive timing means, signal generating means synchronized with said scanning means, and means including gating means controlled by said timing means and arranged in controlling relation to said signal generating means, said gating means being controlled by said timing means to combine the generated signal and the inverse thereof to produce a drive signal proportional to feed rate.

References Cited

UNITED STATES PATENTS

| | | | |
|---|---|---|---|
| 2,499,178 | 2/1950 | Berry et al. ______ | 250—202 X |
| 2,967,246 | 1/1961 | Ostergren ________ | 250—202 X |
| 3,135,904 | 6/1964 | Purkhiser ________ | 250—202 X |
| 3,214,661 | 10/1965 | Duff ____________ | 250—202 X |

JAMES W. LAWRENCE, *Primary Examiner.*

C. R. CAMPBELL, *Assistant Examiner.*

PO-1050
(5/69)

UNITED STATES PATENT OFFICE
CERTIFICATE OF CORRECTION

Patent No. 3,395,282 Dated July 30, 1968

Inventor(s) F.O. Blackwell III

It is certified that error appears in the above-identified patent and that said Letters Patent are hereby corrected as shown below:

Column 9, line 7, the claim reference numeral "7" should read ---8---.

SIGNED AND SEALED
SEP 1 - 1970

(SEAL)
Attest:

Edward M. Fletcher, Jr.
Attesting Officer

WILLIAM E. SCHUYLER, JR.
Commissioner of Patents